United States Patent [19]
Heinemann et al.

[11] Patent Number: 4,926,921
[45] Date of Patent: May 22, 1990

[54] LOUVER

[75] Inventors: Joachim Heinemann, Weinheim; Karl-Heinz Spies, Birkenau; Frank Keller, Weinheim; Bernd Beicht, Gross-Umstadt; Wulf Leitermann, Bad Wimpfen; Rolf Lechler, Necharsulm, all of Fed. Rep. of Germany

[73] Assignees: Firma Carl Freudenberg, Weinheim/Bergstr.; Firma Audi AG, Ingolstadt, both of Fed. Rep. of Germany

[21] Appl. No.: 248,423

[22] Filed: Sep. 23, 1988

[30] Foreign Application Priority Data

Sep. 23, 1987 [DE] Fed. Rep. of Germany ....... 3731980

[51] Int. Cl.$^5$ .............................................. E06B 3/48
[52] U.S. Cl. .................................... 160/115; 160/218; 296/180.3; 98/121.2
[58] Field of Search ...................... 160/115, 104, 370.2, 160/DIG. 1, 219, 220, 218; 296/180.3, 180.1; 98/121.2

[56] References Cited
U.S. PATENT DOCUMENTS 3,411,272  11/1968  Carmon ......................... 98/121.2 X Primary Examiner—Blair M. Johnson
Attorney, Agent, or Firm—Kenyon & Kenyon

[57] ABSTRACT

A louver for selectively closing flow openings defined therethrough comprising a stationary support grid including a plurality of equidistantly spaced, first rods extending in a first direction to define flow openings therebetween, a movable grid including a plurality of spaced, second rods extending parallel to the first rods and being movable relative to the first rods in a second direction perpendicular to the first direction from a first position in which each of the second rods at least partially overlaps a respective one of the first rods to a second position spaced from said first position by a distance approximately equal to the equidistant spacing between said first rods and a plurality of substantially impermeable, flexible, flat structures each having first and second longitudinal edges and each of which is connected along the entire length of its first edge to one of the first rods and along the entire length of its second edge to a respective second rod that at least partially overlaps said one first rod in the first position. The flat structures have a width that is at least as wide as the width of the equidistant spacing whereby when the second rods are moved to the second position the flat structures close the flow openings.

13 Claims, 3 Drawing Sheets

LOUVER

BACKGROUND OF THE INVENTION

The invention relates generally to louvers and more particularly to louvers for selectively closing flow openings defined therethrough which may be used in conjunction with the radiator of a motor vehicle.

In DE-PS No. 34 38 709 a louver is disclosed which may be used with the radiator of a motor vehicle. The louver of this patent comprises a stationary support grid and a movable grid, each of which have equidistantly spaced grid rods which extend parallel to each other. The grid rods are relatively movable in a direction perpendicular to the longitudinal extent of the grid rod by an amount about equal to the spacing between the rods. The rods are movable from a first, at least partly overlapping position to control flow openings defined by the louver. In addition to the stationary grid, two relatively movable shift grids are provided which have relatively movable sliding surfaces exposed to the inflowing air. The problem with such louvers, besides a tendency to rattle, is that it is often difficult to adjust the louver because of stiffness or resistance to movement attributable to the tendency of the sliding surfaces to foul up. This fouling may be caused by particles carried with the inflowing air which are deposited on the sliding surfaces. If the louver does not open or close properly, the reliability and safety of the operation of the louver is not very satisfactory.

The invention is directed to the problem of providing a louver for selectively closing flow openings defined therethrough where the above-mentioned disadvantages do not occur. Thus, the louver of the invention, in addition to being of extremely sturdy construction, must have greatly reduced tendency to rattle and be largely insensitive to the impact of dirt particles carried by the inflowing air. Only in this manner can reliable and safe operation be ensured even in extreme situations.

SUMMARY OF THE INVENTION

This problem is solved by providing a louver for selectively closing flow openings defined therethrough comprising a stationary support grid including a plurality of equidistantly spaced, first rods extending in a first direction to define flow openings therebetween, a movable grid including a plurality of spaced, second rods extending parallel to the first rods and being movable relative to the first rods in a second direction perpendicular to the first direction from a first position in which each of the second rods at least partially overlaps a respective one of the first rods to a second position spaced from said first position by a distance approximately equal to the equidistant spacing between said first rods and a plurality of substantially impermeable, flexible, flat structures each having first and second longitudinal edges and each of which is connected along the entire length of its first edge to one of the first rods and along the entire length of its second edge to a respective second rod that at least partially overlaps said one first rod in the first position. The flat structures have a width at least as wide as the width of the equidistant spacing whereby when the second rods are moved to the second position the flat structures close the flow openings.

The flexible, flat structures may be stiffened along their length. Furthermore, reinforced zones extending along the width of the flat structures may be provided to stiffen the flat structures along their width. The reinforced zones may be connected by flexible hinges extending along the length of the flat structures provided adjacent the longitudinal edges of the flat structures and in the approximate center of the flat structure. The flat structure may be formed as one piece from a polymer material and the flexible hinges may be integrally formed therewith from reduced thickness portions of the polymer material. Each of flat structures and the first and second rods connected thereto may have an outer contour which uniformly merge together in the first position of the louver. The outer contours of adjacent flat structures and the rods connected thereto sealingly abut in the second position. Further advantages may be obtained when the outer contours have a shape similar to the outer contour of an airfoil wing.

Either the stationary support grid or the movable grid may further include vertical guide strips closely spaced to the ends of the flat structures that have a length which is at least equal to the vertical extent of the flat structures. If the guide strips are provided on the stationary grid, they may define guide grooves in which the movable grid is displaceable. A return spring is provided which comprises means for biasing the movable grid to the first position and a shift device is provided which comprises means for moving the movable grid to the second position. The shift device acts against the force of the biasing means and may comprise a pneumatic actuator or solenoid device.

In the louver of the invention, the sliding surfaces of the grid rods of the stationary support grid and of the movable grid overlap at a close distance in the first position to achieve a good sealing therebetween. In every other attainable position of the rods, the sliding surfaces of the rods are shielded against inflowing air by the flat structure to protect against the impact of dirt and other particles. Therefore, these particles cannot accumulate in the region of the relatively movable sliding surfaces. This produces the advantageous result that the forces required to adjust the flow openings do not appreciably change due to foul up, even after long-term use. In addition, the cavity which is formed between the support grid and the movable grid by the partially overlapping grid rods and the flat structure connected thereto is sealed from incoming air flow in the direction of the engine block. Therefore, if a gap were to exist between the partially overlapping grid rods in the first position, flow into the cavity cannot occur thereby eliminating the need for special sealing measures. This ensures safe operation and ease of adjustment especially for use of the louver in the region of the front of a motor vehicle, for instance, in front of a radiator.

Upon displacement of the movable grid of the invention from the first position into the second position, the movable grid rods are displaced to a position adjacent to the next closest grid rods of the support grid. This results in movement of the flat structures from their folded-in first position to an expanded second position such that the flow openings between the adjacent grid rods are completely covered up. The flow passages of the louver that were completely open in the first position are thereby completely closed in the second position. Intermediate flow positions of varying amounts are readily obtainable in dependence upon the amount of actuating force employed by the specific control system used.

Stiffening the flat structure along its length and providing reinforced zones along its width connected by flexible hinges permitting the fold-out and fold-in movement ensures that flutter and rattling is reliably avoided. Provision of flexible hinges at the longitudinal edges and center of the flat structure produces a cross sectional profile of each flat structure that is generally triangular in the first folded-in position and approximately triangular in the second folded-out position to provide static stability and rigidity.

Forming the flat structures as one piece from a polymer material and the flexible hinges integrally therewith from reduced thickness portions eliminates the need for hinge maintenance and ensures a long hinge life and joint tightness. Additionally, manufacture of the flat structure is made especially simple.

When used as a radiator louver, the flat structures may be coated on the side opposite the inflowing air with a heat-insulating material, for example, a foam or fiber material. If this material has an open-pore surface, not only does a shortened warm-up time of a cold motor occur, but also a damping of the sound waves emanating therefrom.

To provide especially good protection against fouling and good air flow or permeability of the open louver, the flat structures and the grid rods connected thereto may have an outer contour that uniformly merges in the first position. In the first position, this contour may approximate the contour of known airfoil wings of aircraft such that, utilizing the effects known therefrom, it is possible to bring the louver, when not in use, into the open position by utilizing the forces resulting from action of the approaching air on the contour. Also, such an outer contour facilitates bringing the mutually facing surfaces of adjacent flat structures and connected grid rods into sealing contact in the second position.

Provision of vertical guide strips for the support grid or movable grid spaced closely adjacent to the ends of the flat structure is of great advantage mechanically and flow dynamically. Also, the close spacing protects the sliding surfaces of the grids against the inflowing air and hence against the deposition of particles. The sliding surfaces include the correspondingly designed guide grooves of the guide strips. The guide strips may have a length at least equal to the maximum vertical extent of the flat structures to seal the ends of the flat structure in their folded state to prevent appreciable flow to the cavity therein.

Provision of the shift device to move the movable grid into the second position greatly simplifies the adjustment of the flow opening to a specific width. The adjustment may, if desired, take place automatically using adjusting devices that are known per se.

When the flat structures are shaped similar to double wings their front ends are turned toward the inflowing air. This makes each flexible, flat structure and the entire assembly especially resistant to backpressure flow. Furthermore, this arrangement provides better stability and avoids rattling. In addition, there is very little fouling tendency because the double wings have a dynamic flow form. Any particles that may be deposited thereon are removed very easily by the high-speed air flow. In particular, fouling of the sliding surfaces of the stationary support and movable grid rods is avoided because the surfaces are shielded by the double wing in the flow direction. In the closed position, the individual double wing structures sealingly abut at their contact surfaces. The contact surfaces are disposed in regions which, just before the closing process, are subject to air flow at a high velocity such that especially clean surfaces are presented for sealing. This ensures uniform abutment of the contact surfaces for good tightness between the double wing structures.

In the closed position of the louver, the double wings may abut each other resiliently such that, even allowing for inevitable manufacturing tolerances, excellent sealing of the approaching air is achieved. A louver constructed according to principles of the invention is explained below with reference to the attached drawings.

DETAILED DESCRIPTION

Figure 1:
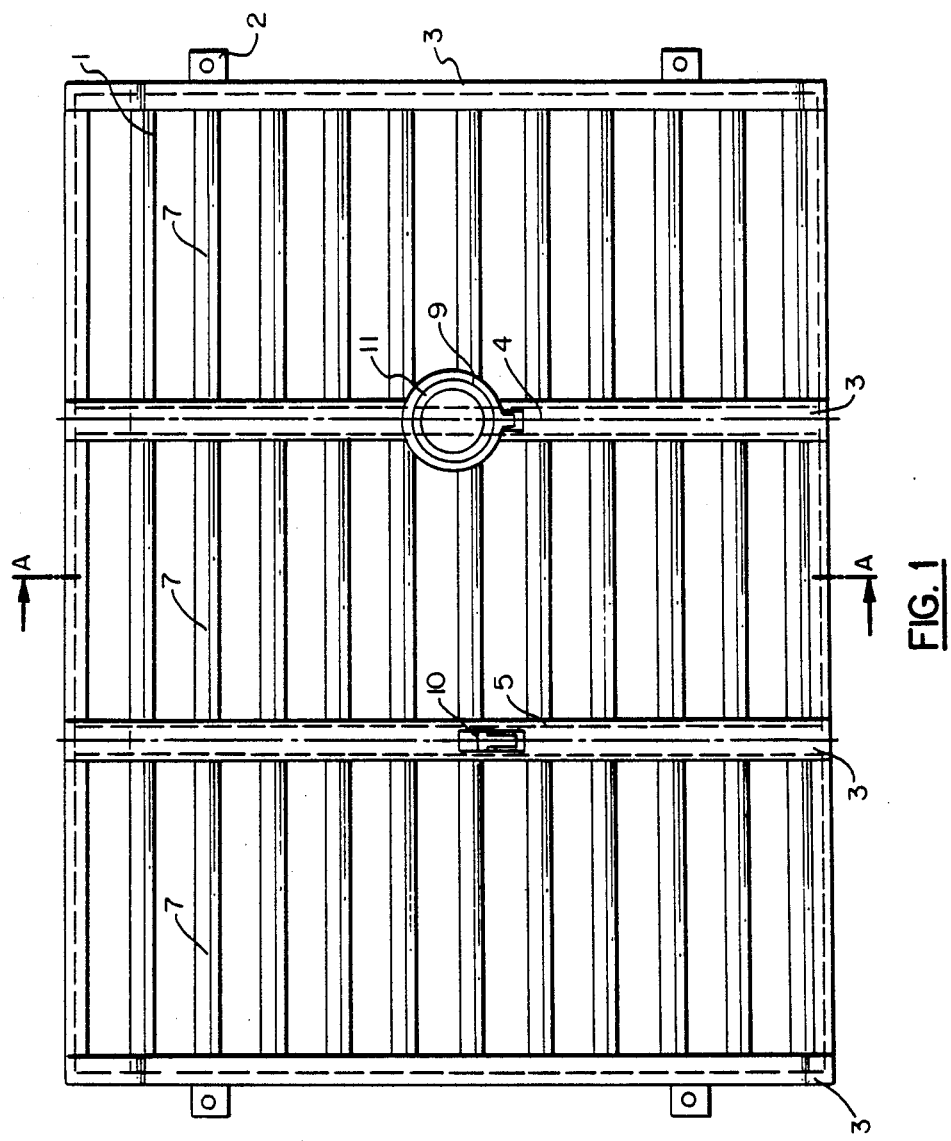
FIG. 1 illustrates an overall front view of an embodiment of a louver constructed according to the principles of the invention shown in the open position.

FIG. 1 shows a front view of a louver constructed according to the principles of the invention in its open position permitting flow therethrough. The stationary support grid 1 may be fixed to a vehicle frame by screws (not shown) fitted through attachment lugs 2. Support grid 1 is provided with vertical guide strips 3 at its ends and in its central region which impart good bending stiffness to the support grid 1. Lugs 2 are connected to the two end guide strips 3. The support grid 1 surrounds the movable grid 4 which is not visible in FIG. 1, but can be seen in FIG. 4. Support grid 1 is connected to movable grid 4 the folded-in, flexible, flat structures 7. Structures 7 are folded over to form the cuneiform double section wings defining a cavity 27 therein.

At the longitudinal ends of structures 7 adjacent grid rods 12 and 14, bead types bulges 19, 20 are provided extending parallel to the length or longitudinal direction of structures 7. The bulges are fitted within and positively held by corresponding grooves formed in the rods 12 and 14. The outer contour of grid rods 12 and 14 and structures 7 uniformly merge together in the open position illustrated in FIG. 2 to produce smooth surfaces for air flow. The flexible, flat structures are guided for movement on both ends by the guide strips 3 connected to the support grid 1. Guide strips 3 are spaced at a small lateral distance from the end faces of the individual flat structures 7. In this manner, air cannot flow into the cavity 27 enclosed by the flat structures 7 in the folded state. This provides excellent protection against accumulation of particles in cavity 27. Thereby, good mobility of the movable grid 4 relative to the support grid 1 is ensured over the life of the louver and also under unfavorable conditions.

As shown in FIG. 1, four guide strips 3 are distributed over the total width of the louver. The individual flat structures 7 have a correspondingly reduced length compared to provision of a fewer number of guide strips, which provides greater mechanical resistance and, in particular, greater bending rigidity. The operational safety of the louver over its useful life is thereby clearly increased.

The central two guide strips 3 shown also carry mounts onto which shift devices 11 are fastened. Only one shift device is illustrated in FIG. 1 In the interest of simplified manufacture, the fixed parts of the shift devices may be integrally formed with the mounts. The shift devices are actuated jointly which, with respect to the total width of the louver, results in a relatively reduced specific load on the individual flat structures 7. Therefore, structures 7 may be of relatively light construction while still having good mechanical resistance.

The two central guide strips 3 contain a respective aperture 9, 10 through which the drive linkage of the shift device 11 is passed and connected with the movable grid 4. The details of this connection are explained below.

Figure 2:
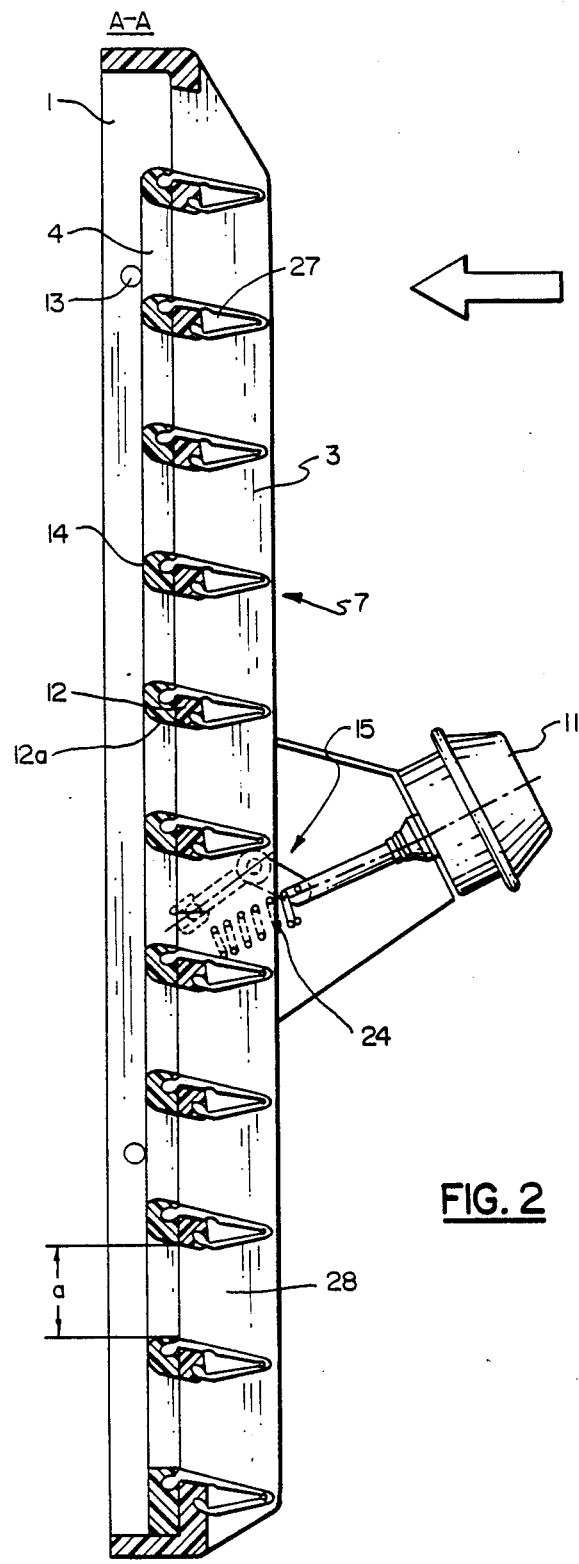
FIG. 2 illustrates a cross sectional view through the louver of FIG. 1 taken along lines A—A showing a pneumatic shift device for setting the position of the louver.

FIG. 2 shows the louver of FIG. 1 in a cross sectional view taken along plane A—A. The support grid 1 with guide strip 3 and the respective grid rods 12, 14, as well as the movable grid 4, are illustrated therein. Each of the two grids 1, 4 may be made in one piece from polypropylene. The spacings of adjacent grid rods 12, 14 are exactly identical to achieve the extensive mutual overlap of respective grid rod surfaces 12a, 14a shown in FIGS. 2 and 4.

The support grid rods 12, connected to guide strips 3 of support grid 1, and the movable grid rods 14, connected to movable grid 4, are joined by the flexible, flat structures 7, which may have a folded-in shape, as previously discussed. The shape is generally triangular in cross section in the open position of the louver, as seen in FIGS. 2 or 4, and approximately triangular in cross section in the closed louver position shown in FIG. 3. Structures 7 have a width transverse to the direction of the inflowing air which does not appreciably exceed the spacing of the grid rods 14. Therefore, the flow openings 28 of the louver are open to their fullest extent in the first position of the flat structures 7 illustrated in FIG. 2.

By actuation of the shift devices 11, the movable grid 4 including the grid rods 14 attached thereto can be moved vertically, as viewed in FIG. 2, by the amount a as a maximum. Backward motion of grid 4 and rods 14 is prevented by guide bolts 13 fixed to the support grid 1. Grid rods 14 are movable from their positions shown in FIGS. 2, 4 in which sliding surface 14a overlaps sliding surface 12a of grid rods 12 to the position shown in FIG. 3. In so moving rods 14, each flexible, flat structure 7 is flapped open such that the originally existing grid flow openings 28 are covered up and the ends of structures 7 adjacent bead 19 abut and sealingly contact the adjacent grid rods 12 of support grid 1. In this position the radiator louver is completely closed and air approaching from the direction shown by the arrows in FIGS. 2, 3 cannot pass therethrough. Intermediate positions of structures 7 of any desired clearance can be readily obtained.

Figure 3:
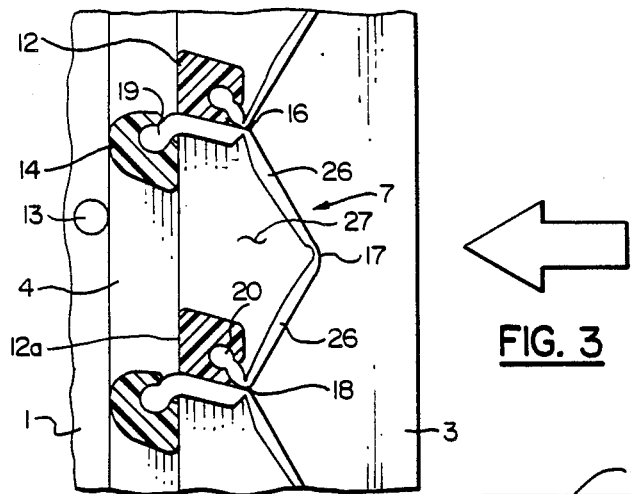
FIG. 3 illustrates an enlarged partial cross sectional view of FIG. 2 showing the closed position of the louver.
Figure 4:
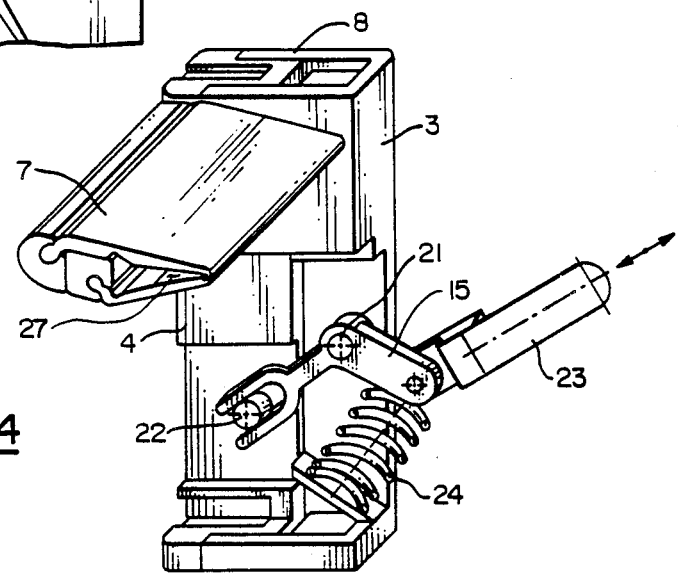
FIG. 4 illustrates a perspective view of a portion of the louver showing the drive mechanism of the shift device and the double wing configuration.

FIG. 3 shows an enlarged detail of the louver in FIG. 2 but, illustrates its closed position. The displacement of the movable grid 4 relative to its support grid 1 causes the flat structures 7 to change from an acute wedge form (FIG. 2) to an obtuse wedge form (FIG. 3) such that the angular relationship of thickened reinforcement zones 26 of flexible structures 7 is altered. Zones 26 are joined together by flexible hinges 16, 17, 18, which are integrally formed, but of reduced thickness. Thus, zones 26 and hinges 16, 17, 18 constitute a one-piece component of each flat structure 7 which may be formed from a polymer or other suitable substantially impermeable material. As previously mentioned, the longitudinal edges 19, 20 of the flat structures 7 are thickened to form bead-like portions positively supported in correspondingly shaped grooves of the grid rods 12, 14.

To further illustrate the construction and operation of the louver of the invention, FIG. 4 shows a portion thereof in perspective, illustrating the transmission linkage 15 between one of the shift devices 11 and the movable grid 4. The actuating force to move grid 4 may be provided, as shown in FIG. 2, by a pneumatic actuator or by other conventional drives, such as a solenoid or the like. Also, to intensify the actuating force in the final closing phase or in the initial opening phase, a toggle lever mechanism may be used with the transmission linkage 15. In the present case the transmission linkage 15 is angled.

The transmission linkage 15 is rotated about pin 21 which is connected to the guide strip 3 of the support grid 1. The movable grid 4 contains an additional pin 22, which is surrounded by the front forked side of the transmission linkage 15. By rotation of linkage 15 about pin 21, the movable grid 4 can be moved vertically in the guide groove formed within guide strip 3 to open and close openings 28 of the louver.

The actuating force acts on the linkage 15 in one direction via the connecting rod 23 to close the louver. A return spring 24 acts on linkage 15 in the opposite direction to bias the louver open, when the shift device, i.e., the pneumatic actuator or the solenoid, is unactuated. This ensures that in case of a malfunction of a sensor, electronic, pneumatic or electric systems the louver is opened to prevent high temperatures, harmful to the cooling system or to the engine, from occurring in the engine block of the motor vehicle.

In additional to the actuating force of the shift device 11 and the restoring force of the return spring 24, the bending forces of the flexible hinges 16, 17 and 18 bias the louver open. This inherent biasing force increases the further the louver is closed. An oppositely directed force is produced by the air flow through the louver under normal operating conditions. This force biases the louver to its closed position and increases the further the louver is closed.

Figure 5:
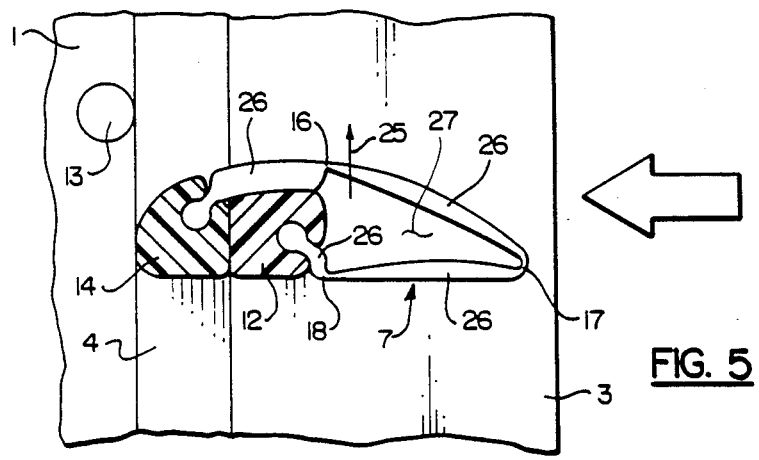
FIG. 5 illustrates an enlarged partial cross sectional view of FIG. 2 showing the double wing configuration in the form of an airfoil wing.

The forces acting the louver or on the individual flat structures 7, respectively, can be influenced by the specific design of the profile or outer contour of the structures 7. For example, the profile may be formed such that each flat structure 7 including the grid rods 12, 14 supporting it, has, when the louver is open, an outer contour shaped similarily to the outer contour of airfoil wings known from aircraft construction. Such a design in illustrated in FIG. 5. In this manner, the action of the air flowing through the louver generates lifting forces 25 which, in the initial phase of the closing of the louver, offset the actuating force. A reverse effect can be obtained by a corresponding profile configuration when the louver is closed. Therefore, with the louver of the invention, any desired characteristic of the louver actuating force may be obtained by appropriate design of profile configuration.

What is claimed is:

1. A louver for selectively closing flow openings defined therethrough comprising:

(a) a stationary support grid including a plurality of equidistantly spaced, first rods extending in a first direction to define flow openings therebetween;

(b) a movable grid including a plurality of spaced, second rods extending parallel to said first rods and being movable relative to said first rods in a straight path in a second direction perpendicular to said first direction from a first position in which each of said second rods at least partially overlaps a respective one of said first rods to a second position spaced from said first position by a distance approximately equal to the equidistant spacing between said first rods; and (c) a plurality of substantially impermeable, flexible, flat structures each having first and second longitudinal edges and each of which is connected along the entire length of its first edge to one of said first rods and along the entire length of its second edge to a respective second rod that at least partially overlaps said one first rod in said first position, said flat structures having a width at least as wide as the width of said equidistant spacing whereby when said second rods are moved to said second position said flat structures close said flow openings.

2. A louver according to claim 1 wherein said flexible, flat structures are stiffened along their length in a direction parallel to said first direction.

3. A louver according to claim 2 wherein said flat structures are stiffened along their width by reinforced zones connected by flexible hinges extending along the length of said flexible, flat structures.

4. A louver according to claim 3 wherein said reinforced zones extend between said flexible hinges along the entire width of the flat structures except that each flat structure has one flexible hinge located approximately in the center of the width of the flat structure and additional joints located adjacent to said first and second longitudinal edges, respectively.

5. A louver according to claim 4 wherein each flat structure is formed as one piece from a polymer material and the flexible hinges are integrally formed therewith from reduced thickness portions of the polymer material.

6. A louver according to claim 5 wherein each of the flat structures and the first and second rods connected thereto have an outer contour which uniformly merge together in said first position.

7. A louver according to claim 6 wherein the outer contours of adjacent flat structures and the first and second rods connected thereto sealingly abut in said second position.

8. A louver according to claim 7 wherein in said first position the outer contours have a shape similar to the outer contour of an airfoil wing.

9. A louver according to claim 1 wherein one of said stationary support grid and said movable grid further includes guide strips closely spaced to the ends of the flat structures.

10. A louver according to claim 9 wherein said guide strips have a length extending parallel to said second direction that is at least equal to the extent of the flat structures provided in the same direction.

11. A louver according to claim 10 wherein said stationary support grid includes said guide strips and each of said guide strips define a guide groove in which said movable grid is displaceable.

12. A louver according to claim 1 further comprising:
means for biasing said movable grid to said first position; and
means for moving said movable grid to said second position against the force of said biasing means.

13. A louver according to claim 12 wherein said biasing means comprises a spring and said moving means comprises a pneumatic actuator.

* * * * *